US008180387B2

(12) United States Patent
Sung et al.

(10) Patent No.: US 8,180,387 B2
(45) Date of Patent: May 15, 2012

(54) METHOD, TERMINAL, AND SYSTEM FOR ESTABLISHING POC GROUP SESSION IN POC SYSTEM

(75) Inventors: Sang-Kyung Sung, Seoul (KR); Sung-Jin Park, Suwon (KR); Ji-Hye Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 747 days.

(21) Appl. No.: 11/637,278

(22) Filed: Dec. 12, 2006

(65) Prior Publication Data

US 2007/0135106 A1 Jun. 14, 2007

(30) Foreign Application Priority Data

Dec. 12, 2005 (KR) .................. 10-2005-0122154
Dec. 11, 2006 (KR) .................. 2006-125787

(51) Int. Cl.
*H04B 7/00* (2006.01)
(52) U.S. Cl. .................. 455/519; 370/395.21
(58) Field of Classification Search .............. 455/518, 455/519; 709/220, 223; 370/471
See application file for complete search history.

(56) References Cited

U.S. PATENT DOCUMENTS

| | | | | |
|---|---|---|---|---|
| 7,280,502 B2 * | 10/2007 | Allen et al. | .................. | 370/329 |
| 7,460,838 B2 | 12/2008 | Hasegawa | | |
| 2004/0219940 A1 | 11/2004 | Kong et al. | | |
| 2005/0255811 A1 | 11/2005 | Allen et al. | | |
| 2006/0053208 A1 * | 3/2006 | Laurila et al. | .................. | 709/206 |
| 2007/0026882 A1 * | 2/2007 | Harris et al. | .................. | 455/518 |

FOREIGN PATENT DOCUMENTS

| | | |
|---|---|---|
| CA | 2495001 | 2/2004 |
| EP | 1 569 473 | 2/2004 |
| JP | 2001-069249 | 3/2001 |
| JP | 2005-217584 | 8/2005 |
| WO | WO 2005/104594 | 11/2005 |

OTHER PUBLICATIONS

OMA, Open Mobile Alliance: "XML Document Management Requirements", Candidate Version 1.0, Mar. 17, 2005.
OMA, Open Mobile Alliance: "PoC XDM Specification", Draft Version 1.0, Jan. 31, 2005.
OMA, Open Mobile Alliance: "XML Document Management (XDM) Specification", Candidate Version 1.0, Nov. 22, 2005.
OMA, Open Mobile Alliance: "XML Document Management Architecture", Candidate Version 1.0, Oct. 19, 2005.
OMA-PAG WG / MGW-IM WG: "XDM Search Architecture", Oct. 11, 2005.

* cited by examiner

*Primary Examiner* — Tu X Nguyen
(74) *Attorney, Agent, or Firm* — The Farrell Law Firm, P.C.

(57) ABSTRACT

A method, a terminal, and a system for establishing a Push to Talk Over Cellular (PoC) group session in a PoC network based on session initiation information, such as information regarding presence of clients to be invited or session start-up time. According to the method, Universal Resource Indicator (URI) information regarding invitation and Information Reservation Service (IRS) parameters are set up in a PoC eXtensible markup language Document Management Server (XDMS), and a PoC server is requested to provide an IRS so that a session is established.

13 Claims, 8 Drawing Sheets

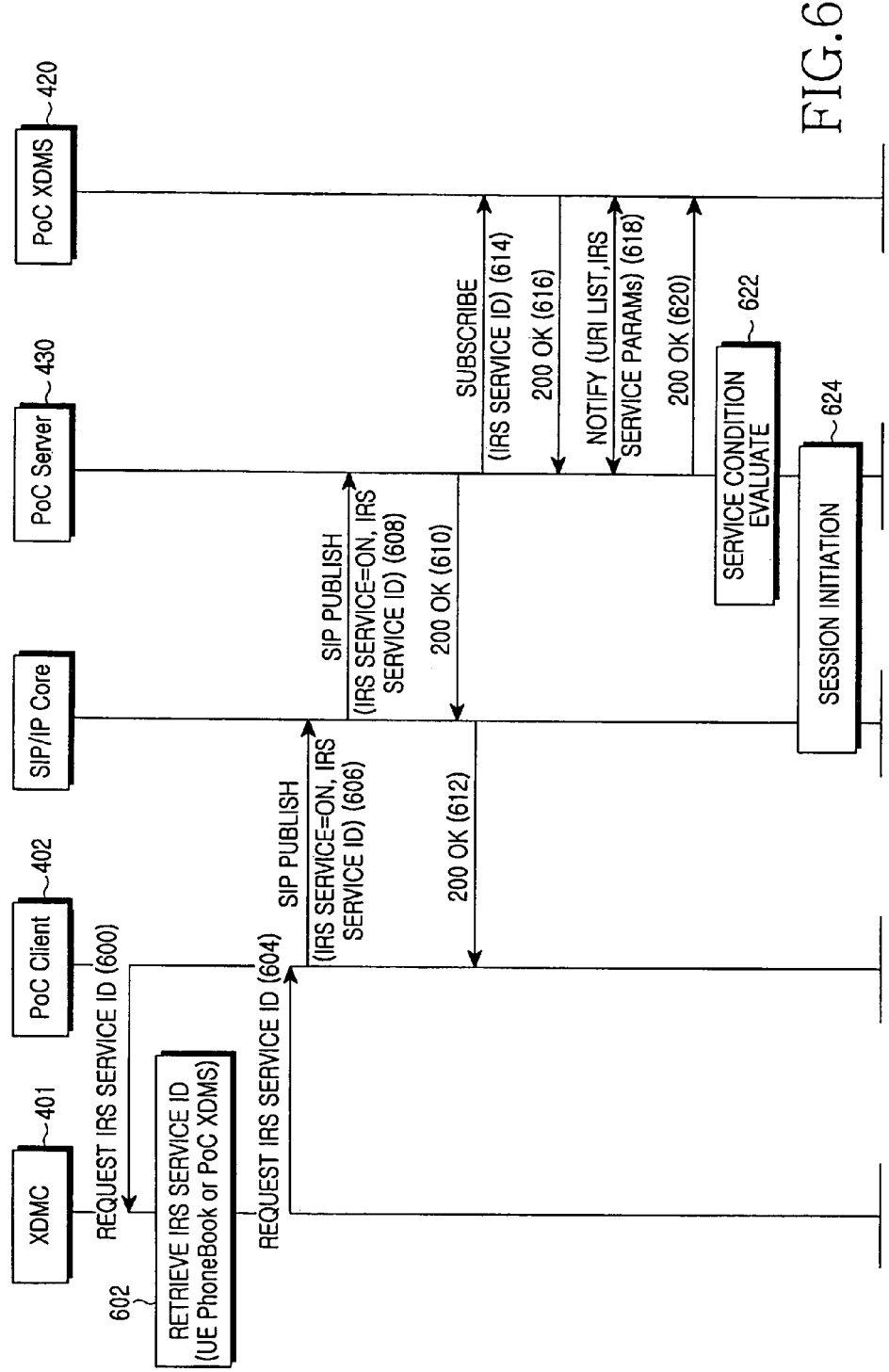

```
PUT http://xcap.example.com/services/resource-
    lists/users/sip:joebloggs@example.com/friends.xml HTTP/1.1
...

Content-Type: application/irs-params+xml
Content-Length: (...)

<?xml version="1.0" encoding="UTF-8"?>
< irs-settingxmlns="urn:ietf:params:xml:ns:irs-setting">
  <irs-params xmlns="urn:ietf:params:xml:ns:irs-params">
    <trigger type="start-time">
       <data>GMT:2005-01-10-12:30:00</data>
    </trigger>
    <trigger type="presence">
       <data>all Available</data>
    </trigger>
    <trigger type="exiry">
       <data>GMT:2005-01-10-13:00:00</data>
    </trigger>
  </irs-params">
  <resource-lists xmlns="urn:ietf:params:xml:ns:resource-lists">
   <list name="My_friends">
    <entry uri="sip:friends10@example.com">
     <display-name>Friend10</display-name>
    </entry>
   </list>
  </resource-lists>
</irs-setting>
```

FIG.7

```
PUBLISH sip:cf_server@example.domain.com SIP/2.0
Via: SIP/2.0/UDP client_pc.domain.com;branch=z9hG4bK776sgdkse
From: <sip:client_a@domain.com>;tag=49583
To: <sip:cf_server@example.domain.com>
Call-ID: asd88asd77a@client_apc.domain.com
CSeq: 80 PUBLISH
Max-Forwards: 70
Accept-Contact: *;+g.poc.talkburst;require;explicit
Content-Type: application/poc-settings+xml
Content-Length: <appropriate value>

<?xml version="1.0" encoding="UTF-8"?>
<poc-settings
    xmlns="urn:oma:params:xml:ns:poc:poc-settings"
    xmlns:xsi="http://www.w3.org/2001/XMLSchema-instance"
    xsi:schemaLocation="urn:oma:params:xml:ns:poc:poc-settings">

<am-settings>
     < answer-mode>automatic</answer-mode>
  </am-settings>
  <note>Invitation Reservation Service</note>
  <irs-service>
      < irs-service active="true">
      <irs-id ="xx000101">
  </irs-service>
</poc-settings>
```

FIG.8

METHOD, TERMINAL, AND SYSTEM FOR ESTABLISHING POC GROUP SESSION IN POC SYSTEM

PRIORITY

This application claims priority to an application filed with the Korean Intellectual Property Office on Dec. 12, 2005, assigned Serial No. 2005-122154, and filed on Dec. 11, 2006, assigned Serial No. 2006-125787, the contents of both of which are incorporated herein by reference.

BACKGROUND OF THE INVENTION

1. Field of the Invention

The present invention relates to a method, a terminal, and a system for establishing a Push to Talk Over Cellular (PoC) group session in a PoC system. More particularly, the present invention relates to a method, a terminal, and a system for providing an Invitation Reservation Service (IRS) while interworking with a PoC eXtensible markup language Document Management Server (XDMS).

2. Description of the Related Art

As a result of breakthroughs in mobile communication technology and extensive use of communication networks, a larger range of services and applications are provided via mobile telephones. In addition to basic communication services, users are demanding more diversified services, including a positioning service, a multimedia service, and a Push to Talk (PTT) service. In particular, the PTT service supports various additional functions (e.g., instant messenger, condition indicator, etc.), as well as group and voice communication provided by conventional wireless telegraphs or Trunked Radio Systems (TRSs).

Various efforts are being made in the industry to realize the concept of PTT as a service based on mobile communication networks, i.e. PoC service, and enact corresponding standards. One of the distinctions between conventional mobile communication services and the PoC service is that, according to the latter, users can perform communication while moving between sessions, if necessary, because they belong to a plurality of sessions. The requirement that users must be able to communicate while moving through a plurality of sessions is described in PoC Regulation 1.0 of Open Mobile Alliance (OMA), an organization regulating pertinent mobile communication services.

The PoC Regulation 1.0 provides that a PoC session is divided into a one-to-one PoC session and a group PoC session. Such a PoC session is initiated when a PoC client transmits a session request message to a PoC server. However, when all members of an ad hoc group session or prearranged group session want to participate in communication, the session initiator must confirm one by one if all clients can communicate at that time. To this end, the PoC client must repeatedly subscribe to and check the presence information of corresponding clients. Such repeated check of presence information requires signaling via wireless access networks. This increases the cost and wastes wireless resources.

In an attempt to solve this problem, it has been suggested to employ a Session Initiation Protocol (SIP) PUBLISH method to realize network-based session initialization. According to this conventional technique, a PoC terminal requests a PoC service to provide an IRS, and session setup parameters are stored in the PoC server in response to the request. As used herein, the IRS refers to a service, the session of which is initiated from a network by presence information or other session setup parameters.

The technique requires extension of the format of an eXtensible Markup Language (XML) schema for a PoC service setting, as provided by PoC Regulation 1.0, and XML data is stored in the PoC server. Considering the characteristics of XML data, which requires dynamic access to stored documents and convenience in editing, storage of IRS data in the PoC server may increase the load on the server during management of PoC sessions, e.g. when a number of PoC group sessions are established.

SUMMARY OF THE INVENTION

Accordingly, the present invention has been made to solve the above-mentioned problems occurring in the prior art, and an object of the present invention is to provide a method, a terminal, and a system for providing an IRS while interworking with a PoC XDMS so load on a PoC server is reduced when a PoC system provides an IRS.

Another object of the present invention is to provide a method, a terminal, and a system for reducing the burden of signaling on a PoC server and efficiently managing an XML document regarding an IRS by separating the management of service parameters for an IRS from a process for requesting an IRS.

In order to accomplish these objects, there is provided a method for providing an IRS to establish a PoC group session in a PoC system, the method including setting up IRS-related information in a PoC XDMS by a PoC terminal, the IRS-related information defining a session initialization condition; transmitting an IRS identification (ID) for identifying the IRS-related information to the PoC terminal by the PoC XDMS; and requesting a PoC server to provide an IRS for session initialization by using the IRS ID by the PoC terminal.

In accordance with another aspect of the present invention, there is provided a system for establishing a PoC group session in a PoC system, the system including a PoC terminal; a PoC XDMS; and a PoC server, wherein the PoC terminal sets up IRS-related information in the PoC XDMS, the IRS-related information defining a session initialization condition, and requests the PoC server to provide an IRS for session initialization by using an IRS ID, the PoC XDMS transmits the IRS ID for identifying the IRS-related information to the PoC terminal, and the PoC server performs session initialization by using the IRS ID when an IRS request message is received.

In accordance with another aspect of the present invention, there is provided a terminal for establishing a PoC group session in a PoC system, the terminal including a data transmission unit for transmitting/receiving packet data to/from a PoC server; an XML Document Management Client (XDMC) for transmitting IRS-related information to a PoC XDMS to set up an IRS parameter, the XDMC storing an IRS ID for identifying the IRS parameter when the IRS ID is received form the PoC XDMS; a PoC client for requesting the PoC server to provide an IRS by using the IRS ID at an IRS request; and a memory unit for storing the IRS ID received from the PoC XDMS.

BRIEF DESCRIPTION OF THE DRAWINGS

The above and other objects, features, and advantages of the present invention will be more apparent from the following detailed description taken in conjunction with the accompanying drawings, in which:

FIG. 6 is a flowchart showing steps for requesting a PoC server to provide a PoC client with an IRS by using an IRS ID;

FIG. 7 shows an example of a message transmitted when an IRS is requested in the course of FIG. 5; and FIG. 8 shows an example of a message transmitted to a PoC server by a PoC client when an IRS is requested in the course of FIG. 6.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein is omitted to avoid making the subject matter of the present invention unclear.

It will be assumed in the following description that the present invention is applied to a Push to Talk (PTT) system, particularly a PTT Over Cellular (PoC) system for providing a PTT service via a cellular mobile communication network. In general, a PoC system employs an Session Initiation Protocol (SIP) and an extended SIP to transmit session participation information for group communication, as well as an extensible Markup Language (XML) Configuration Access Protocol (XCAP) to obtain group information. These protocols are used to realize functions of the present invention, as will be described below, and the basic structure of the present invention is grounded by a PoC Regulation 1.0 system.

The present invention is directed to a method and a system for efficiently providing an IRS while interworking with a PoC XDMS when an IRS is provided in an Open Mobile Alliance (OMA) PoC system.

A conventional PoC system, to which the present invention is applicable, will now be described.

Figure 1:
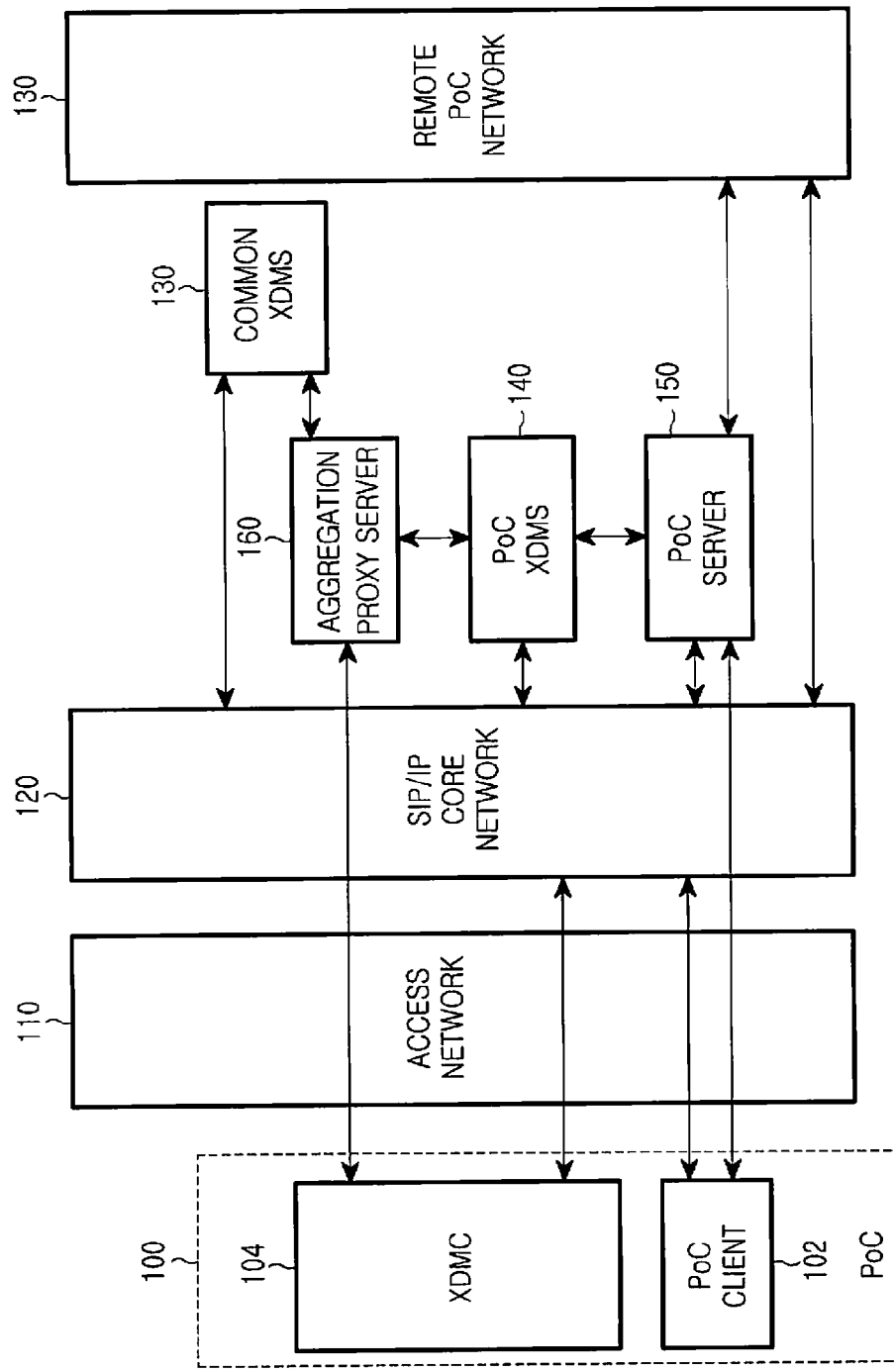
FIG. 1 shows the construction of a conventional PoC system

FIG. 1 shows a conventional PoC system and a relevant network structure. This PoC system includes a PoC User Equipment (UE) or Terminal 100, XML Document Management Servers (XDMSs) 130 and 140, and a PoC server 150. The PoC system may further include an aggregation proxy server 160. These components are connected to one another via an access network 110, a Session Initiation Protocol/Internet Protocol (SIP/IP) core network 120, and a remote PoC network 170.

Respective components will now be described.

The PoC UE 100 includes a PoC client 102 and an XML Document Management Client (XDMC) 104.

The PoC client 102 is incorporated in the PoC UE 100 as a service requester. Particularly, the PoC client 102 resides in the PoC UE 100 and performs network access so a PoC service subscriber is provided with a PoC service via the PoC UE 100. In the following description, the term "PoC client" will collectively refer to a UE incorporating the same and a PoC service subscriber, and its reference will be omitted unless otherwise noted.

The PoC client is mainly used to enable a PoC service subscriber (i.e., a PoC user) to establish a PoC session, participate an already established session, or terminate an established session. The PoC client also has the functions for creating and transmitting a talk burst, supporting an instant personal alert, and authenticating an access to a PoC service. The PoC client is connected to the SIP/IP core network 120, which plays a crucial role in supporting SIP/IP multimedia services, via the access network 110.

The SIP/IP core network 120 is connected to the PoC server 150 and the XDMSs 130 and 140 to provide a PoC service. The PoC server 150 has a "controlling PoC" function for maintaining and managing PoC sessions and a "participating PoC" function for participating in a PoC session established for unilateral or multilateral communication.

Meanwhile, a PoC service may be followed by a group session setup service, such as conference communication. To this end, OMA standards define an XML Document Management Client (XDMC) 104 and XDMSs 130 and 140 for a group list service. FIG. 1 shows a PoC XDMS 140 dedicated to a PoC service and a common XDMS 130 compatible with other service enablers. Information regarding groups and group members is inputted to the XDMSs 130 and 140 via the PoC client. From a list of individuals or groups received from the XDMSs 130 and 140, the PoC client obtains information regarding PoC clients it can call. Creation, modification, and management of groups and group members regarding the XDMSs 130 and 140 may be conducted via a communication network, which can be relied on by PoC service providers, such as Internet or intranet. Further description of protocols for managing XML documents (e.g. creation, modification, and removal of group lists) will be omitted for clarity.

Upon receiving a request regarding group lists from the XDMC 104 during a group service, the aggregation proxy server 160 routes it to respective XDMSs 130 and 140 according to a suitable rule.

The PoC server 150 will now be described.

Figure 2:
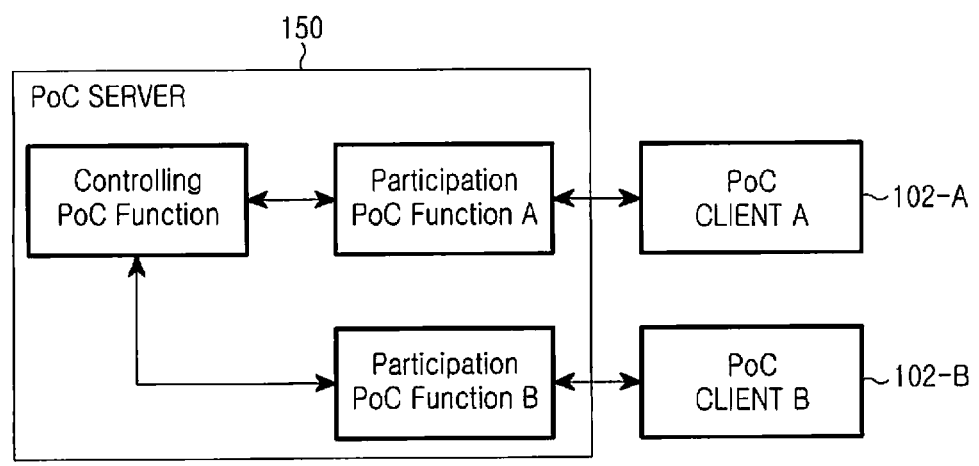
FIG. 2 is a block diagram showing the operation of a conventional PoC server

FIG. 2 shows a conventional PoC server 150. The functionality of the PoC server 150 may be divided into a "Controlling PoC Function" (hereinafter, referred to as CF) for maintaining and managing PoC sessions on a broad scale and a "Participating PoC Function" (hereinafter, referred to as PF) for maintaining and managing respective sessions. Functional characteristics of the PoC server will now be described with reference to Tables 1 and 2 given below.

TABLE 1

Controlling PoC Function (CF)

Provides centralized PoC session handling
Provides the centralized Media distribution
Provides the centralized Talk Burst Arbitration functionality including talker identification
Provides SIP session handling, such as SIP session origination, termination, etc.
Provides policy enforcement for participation in group sessions
Provides the participants information
Collects and provides centralized media quality information
Provides centralized charging reports
May provide transcoding between different codecs
Support Talk Burst Control Protocol Negotiation Among the functionality of the PoC server 150, the CF is related to the overall management of PoC sessions, as shown in Table 1. Particularly, the CF sanctions PoC clients' request for a floor, decides the order, and empowers them. When a PoC client requests a talk burst, it is distributed to other PoC clients participating in the same group calling. In addition, information regarding PoC clients participating in the group calling is provided.

The PF is related to the management of sessions linked with the CF and respective PoC clients during a PoC session, as shown in following Table 2. Particularly, the PF relays a PoC client's request for a floor, as well as a grant of a floor to the PoC client by the CF. In addition, the PF relays media between the CF and PoC clients and, if different coder/decoders (codecs) are used between them, the PF transcodes them. When a talk begins in a session while another talk is going on in a different session (i.e., during a simultaneous session), one of them is filtered based on the PoC user's selection.

TABLE 2

Participating PoC Function (PF)

Provides PoC session handling
May provide the Media relay function between PoC Client and Controlling PoC server
May provide user media adaptation procedures
May provide Talk Burst control message relay function PoC Client and Controlling PoC server
Provides SIP session handling, such as SIP session origination, termination, etc., on behalf of the represented PoC Client
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 shows a CF block and PF blocks of the PoC server 150 shown in FIGS. 1 and 2.

Figure 3:
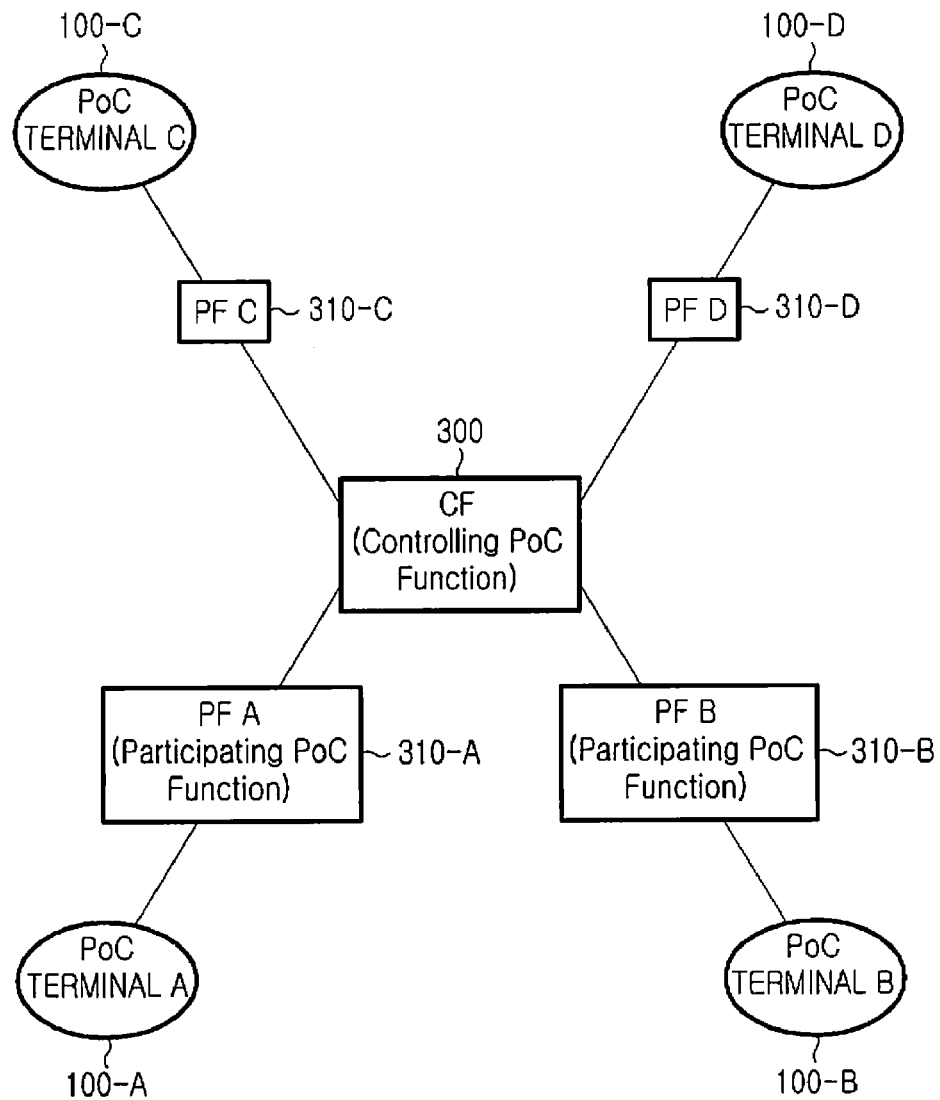
FIG. 3 shows a Controlling PoC Function (CF) block and Participating PoC Function (PF) blocks of the PoC server shown in FIGS. 1 and 2

Referring to FIG. 3, respective PoC clients 102-A to 102-D access a CF block 300 via PF blocks 310-A to 310-D and set up a PoC session. The CF block 300 endows the PoC clients with a floor, and their media corresponding to the floor are transmitted to respective PoC clients. Even though endowed with the floor, the PoC clients cannot take the floor until they check information regarding PoC clients participating in the group session.

Meanwhile, call processing technology for communication connection in a PoC system may have various procedures depending on requirements and conditions of transmission and reception sides. Characteristics of a PoC system used by such setups of the transmission and reception sides, based on OMA, will now be described.

The reception side can select its response mode from automatic and manual response modes at the request of a PoC client. In the automatic response mode, a response is directly sent to the transmission side by a corresponding network, instead of the receiver's manual response, when the transmission side is included in a PoC client list prepared by the reception side. Such an automatic response sent by the network without operating a terminal is based on the fact that the PoC server can store information regarding the response mode and a corresponding user list in accordance with a response mode setup request of the terminal. In the manual response mode, particularly, when the transmission side is not included in the automatic response user list, when it is unclear if the transmission side is included in the list or not, or when the receiver wants manual response to every user, a PoC communication request is transmitted to the terminal via the reception network so that the call is connected after the PoC client's permission.

The PoC system may enter into an on-demand session mode or a pre-established session mode depending on the connection setup to a PoC server in the user's home network. In the pre-established session mode, a session is pre-established by a PoC client as desired between him and a PoC server belonging to his home network. The pre-established session is necessary to negotiate a media parameter to be used by a PoC client with the PoC server in advance so that a session can be established rapidly without repeatedly negotiating a media parameter between the PoC server and the client for future use.

In order to set up a prior session, a PoC client employs an SIP method to provide a media parameter supporting a body, particularly an Session Description Protocol Multipurpose Internet Mail Extensions (SDP MIME) body. The PoC client provides a media parameter, which has been received from the server, and responds to the media parameter. Upon receiving a response message from the server, the PoC client inserts identification information of a newly established prior session, particularly conference URI, and sends it to the PoC client.

When the prior session is used, it is possible to negotiate in advance an IP address, a port number, a codec to be used, and a talk burst control protocol. The on-demand session mode corresponds to a case in which no prior session has been set up by any PoC client. This means that a procedure for connecting a PoC call is performed after an invitation message is received from another PoC client.

The setup of a response mode with regard to a communication request in a PoC system can be stored in both a PoC server, which is a network element, and a PoC client, which is a terminal.

When a response mode is set up in a home network managing a PoC client, the response mode is realized in a PoC server having a PF in the network to which the PoC client belongs.

When a response mode has been set up in a network, the PF automatically responds to another PoC server's request for PoC communication by transmitting a session progress message to the network, which has requested communication. Therefore, in the automatic response mode, the communication request procedure is simpler than in the case of a response after transmission of a session setup message to the PoC client. This reduces the time for initially granting a floor.

When the network responds automatically, the result may differ from the user's intention, depending on the situation. Therefore, a PoC client may have its own response mode setup, which is preferential over that of the network. This is for the purpose of avoiding a privacy problem occurring when a PoC client modifies its response mode and requests the PoC server to update the response mode, but the response mode is not updated in real time due to signal delay or error in the network.

In summary, although a user can set up a response mode for both a PoC server and a PoC client in the case of a PoC service, the response mode setup of the PoC client reflects the user's latest intention. Therefore, a decision is made based on the response mode for the PoC client when a stream of media (e.g. user's actual voice or image) is transmitted.

A procedure for establishing a PoC multimedia session in a PoC system, which has the above-mentioned characteristics, will now be described.

A transmission-side PoC client uses an SIP protocol and transmits a message for inviting a multimedia, including various formats of audio, video, and texts depending on a designated media type, in order to request call processing. In response to the call processing request, a reception-side client follows various responding procedures in accordance with a response mode setup in the corresponding PoC server and a prior session, if any. An example of a procedure for processing a call for PoC communication will now be described in the case of transmission-side and reception-side networks, respectively.

A transmission-side PoC client sends an SIP invitation request, which include information regarding the SIP address of a desired reception-side PoC client, to a corresponding SIP/IP core network. The SIP invitation message may further include information regarding the PoC address of the transmission-side PoC client, requested media parameters, and information regarding a characteristic value indicating a PoC service. The requested media parameters may include a number of characteristic values indicating, for example, an encoding method regarding audio and video, a rate, a payload type, etc., when a multimedia session is requested.

The SIP invitation message is transmitted to a PF server via a corresponding IMS server in an IMS network, particularly via Proxy Call Session Control Function (P-CSCF) and Serving Call Session Control Function(S-CSCF), based on a path query in a Dynamic Host Configuration Protocol (DHCP) server or Domain Name Server (DNS) server. In the case of a normal communication request, a PF server, to which a PoC client is connected, may be realized to be separate from a CF server for managing the talk burst of an established session. Therefore, the SIP invitation request, which has been sent to the PF server, is transmitted to the CF server via an SIP/IP core network of a corresponding network.

A PoC session control network incorporating a CF transmits the SIP invitation message to the reception-side network and receives a response message from the reception-side network. Depending on the reception-side PoC client and PF setup, the SIP response message from the reception-side network may contain a provisional response (1xx), a successful response (2x), or an erroneous response (4xx-6xx). In the case of an automatic response mode, an SIP 183 "session progress" signal may be received as a response message, which is used to connect the PoC server and the client in the IMS network of the communication requester. As a communication permission signal of the reception-side PoC client, an SIP 183 "session progress" or SIP 200 "OK" response is transmitted to the PoC client via CF and PF PoC servers. Upon receiving the SIP 183 "session progress" or SIP 200 "OK" signal from the reception-side PoC server, the CF confirms that the PoC call has been connected and transmits a floor grant signal to the transmission-side PoC client so a talk burst floor is granted. The response to the SIP 183 "session progress" or SIP 200 "OK" signal, i.e. a response regarding the talk burst floor is either "confirmed" or "unconfirmed". When the CF receives the "unconfirmed" response, it uses a buffering function.

Upon receiving a response signal to the SIP invitation request signal, the transmission-side PoC client receives a signal for permitting talk burst transmission, e.g., a floor grant signal for transmitting a ring back tone, via an RTCP protocol. The floor grant signal is created by a CF authorized to mediate talk burst and is transmitted to a PoC client via a PF managing the corresponding PoC client. The floor grant signal may bypass an SIP/IP core network (e.g. IMS), because a bearer path, not an SIP protocol, is used. After confirming the ring back tone, the PoC client transmits a voice stream by using an Real-time Transport Protocol (RTP), for example.

A system for establishing a PoC group session in a PoC system, which is constructed as mentioned above, while interworking with a PoC XDMS will now be described with reference to FIG. 4, which shows a system for providing an IRS while interworking with a PoC XDMS according to the present invention.

Figure 4:
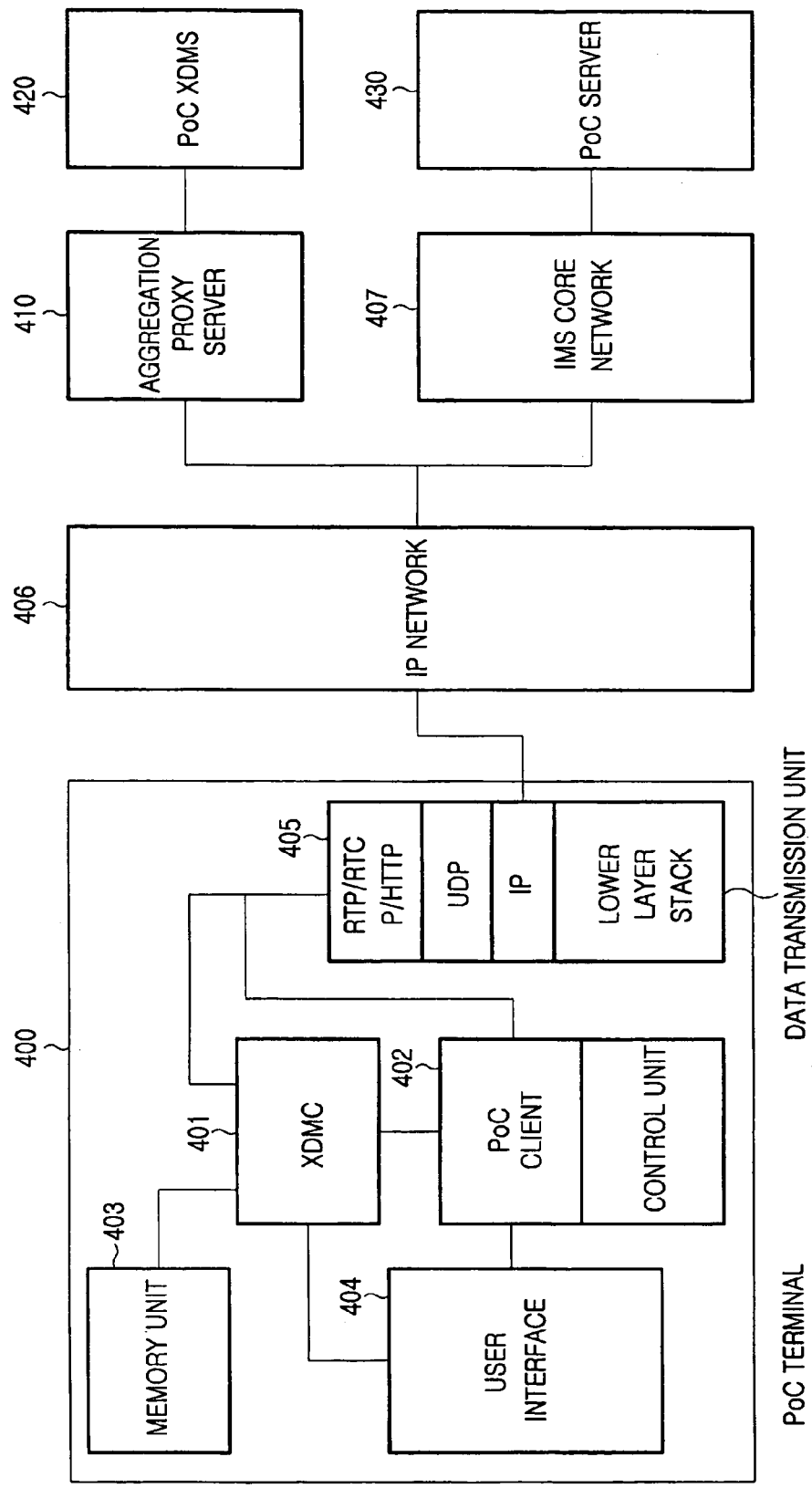
FIG. 4 is a block diagram showing a system for providing an IRS while interworking with a PoC XDMS according to the present invention.

Referring to FIG. 4, the inventive system includes a PoC UE 400, a PoC XDMS 420, and a PoC server 430. The PoC UE 400 is connectible to the PoC XDMS 420 via an IP network 406 and an aggregation proxy server 410. The PoC UE 400 is also connectible to the PoC server 430 via the IP network 406 and an IMS core network 407.

The PoC UE 400 includes a control unit for controlling the overall operation of the UE; a PoC client 402 for processing an SIP protocol used to establish and manage PoC sessions; an XDMS 401 for managing XML documents used for PoC services; a memory unit 403 for storing information regarding the address and group of PoC clients, as well as information regarding the IRS proposed by the present invention; a user interface 404; and a data transmission unit 405. The user interface 404 transmits the user's input to the PoC UE 400. The data transmission unit 405 transmits/receives packet data. To this end, the data transmission unit 405 may include transmission protocol stacks, e.g. RTP/RTP Control Protocol (RTCP)/HyperText Transfer Protocol (HTTP) (RTP/RTCP/HTTP), UPD, IP, and lower layer stacks.

The PoC client 402 establishes a session at the user's request by means of the user interface 404 and, when Uniform Resource Identifier (URI) information or group URI information stored in the memory 403 is necessary, retrieves address information while interworking with the XDMC 401 inside the UE. The memory 403 inside the UE manages URI list information as an XML document. The memory 403 may also store IRS-related information, which is stored in the PoC XDMS 402 by the XDMS 401, by using the same IRS ID.

Steps for storing IRS-related information in the PoC XDMS 420 by the XDMS inside the PoC UE 400 and receiving an IRS ID from the PoC XDMS 420 will now be described with reference to FIG. 5, which shows the flow of signals between a PoC UE for providing an IRS and a PoC XDMS according to the present invention.

The XDMC 401 inside the UE creates an IRS parameter wanted by the user. The IRS parameter may include at least one of the following information to initiate session by PoC Server, comprising e.g., the minimum number of PoC clients that can be invited, answer mode of the invited PoC client, PoC service registration status of the invited PoC client, the presence information type for session initiation, the session initiation time, the session request triggering condition, and the expiration time of the IRS request.

The XDMC 401 uses an XCAP protocol and transmits an HTTP PUT message, including the created IRS parameter and URI information for session setup, to the PoC XDMS 420 in steps 500 and 502. The XCAP enables easy access to and editing of XML documents. The created IRS parameter is transmitted to the aggregation proxy server 410 by using the HTTP PUT message. The aggregation proxy server 410 performs authentication, compression, and routing of requested messages. Particularly, the aggregation proxy server 410 forwards messages to the PoC XDMS 420, which is the destination of corresponding XML documents. As mentioned above, the transmitted HTTP PUT message may include URI list or group URI information, to which an IRS is to be applied, as well as IRS parameters. Target URI information is transmitted together with a PoC IRS session initiation condition, particularly an IRS parameter. The IRS ID included in the response is used to identify a list setup and an IRS parameter.

After receiving the message, the PoC XDMS 420 stores the IRS-related parameter included in the received message. An IRS ID for mapping the IRS parameter is created and transmitted to the corresponding XDMC 401 via the aggregation proxy server 410, while being included in a response message, in steps 504 and 506. The XDMC 401 may selectively store the received IRS ID in the memory unit 403 in step 508. Although the present embodiment has been described on an assumption that the XDMC requests the PoC XDMS to provide a service parameter and that the PoC XDMS creates an IRS ID in response to the request and transmits it to the XDMS, the XDMC may create the IRS ID by itself In this case, the XDMC has to neither receive an IRS ID, which has been mapped by the PoC XDMS, nor initiate a session.

As such, the process of setting up IRS-related information for defining a condition for initiating a network-based session between the XDMC 401 inside the PoC UE 400 and the PoC XDMS 420 includes transmission/reception of an IRS parameter, which acts as a session initiation condition of a PoC IRS, and an IRS ID for identifying an IRS parameter setup.

An example of an HTTP PUT message transmitted from the XDMC 401 to the PoC XDMS 420 in the course of FIG. 5 will now be described with reference to FIG. 7, which shows an XML document type of an IRS parameter to be transmitted to the PoC XDMS 420 by the XDMC 401. The body of the HTTP PUT message includes a field value of "irs-setting", which indicates an XML document newly defined for an IRS, a sub-field value of "irs-params" for an IRS parameter, and "resource-list" indicating target URI information. The field value of "irs-params" consists of session start-up time, presence information, and reservation expiration time. The field value of "resource-list" consists of a UIR list or group URI information representing it.

As mentioned above, according to the present invention, the PoC UE 400 pre-stores IRS information, such as URI information regarding invitation for session establishment and an IRS parameter, in the PoC XDMS 420 via the XDMC 401. Based on the stored information, the PoC UE 400 receives an ID from the PoC XDMS 420, which provides an IRS mapped onto the stored information.

Upon receiving the user's input for requesting an IRS, the PoC client 402 of the PoC UE 400 uses the IRS ID and requests the PoC server 430 to provide an IRS so that a session is established. FIG. 6 shows steps for requesting a PoC server to provide a PoC client with an IRS by using an IRS ID according to the present invention.

The PoC client 402 transmits a message for requesting an IRS ID to the XDMC 401 inside the UE in order to request an IRS. Upon receiving the message, the XDMC 401 retrieves an IRS ID in step 602. The XDMC 401 transmits the retrieved IRS ID to the PoC client 402 in step 604. Instead of obtaining the IRS ID directly from the PoC XDMS 420 by using an XDMC function, as has been described with reference to FIG. 5, an IRS ID stored in the memory unit 403 may be used. The IRS ID transmission process may also be realized by specific internal signaling between the PoC client 402 and the XDMC 401. Specifically, the step of retrieving the IRS ID at the request of the PoC client 402 may include at least one of a step of retrieving XML data inside the PoC XDMS 420 and a step of retrieving the IRS ID from the memory unit 402 inside the UE, the memory unit 402 storing XML data while being synchronized with the PoC XDMS server.

The PoC client 402 transmits the received IRS ID and a message for requesting an IRS to the PoC client 430 in the home network via an SIP/IP core network in steps 606 and 608. The message for requesting an IRS may be an SIP PUBLISH message, and the PoC service setting value included in the SIP PUBLISH message may be used to designate a field value of "IRS" and announce if the IRS is applied or not. For example, when the field value is "on", the IRS is requested and, when the field value is "off", the IRS is not requested.

Figure 5:
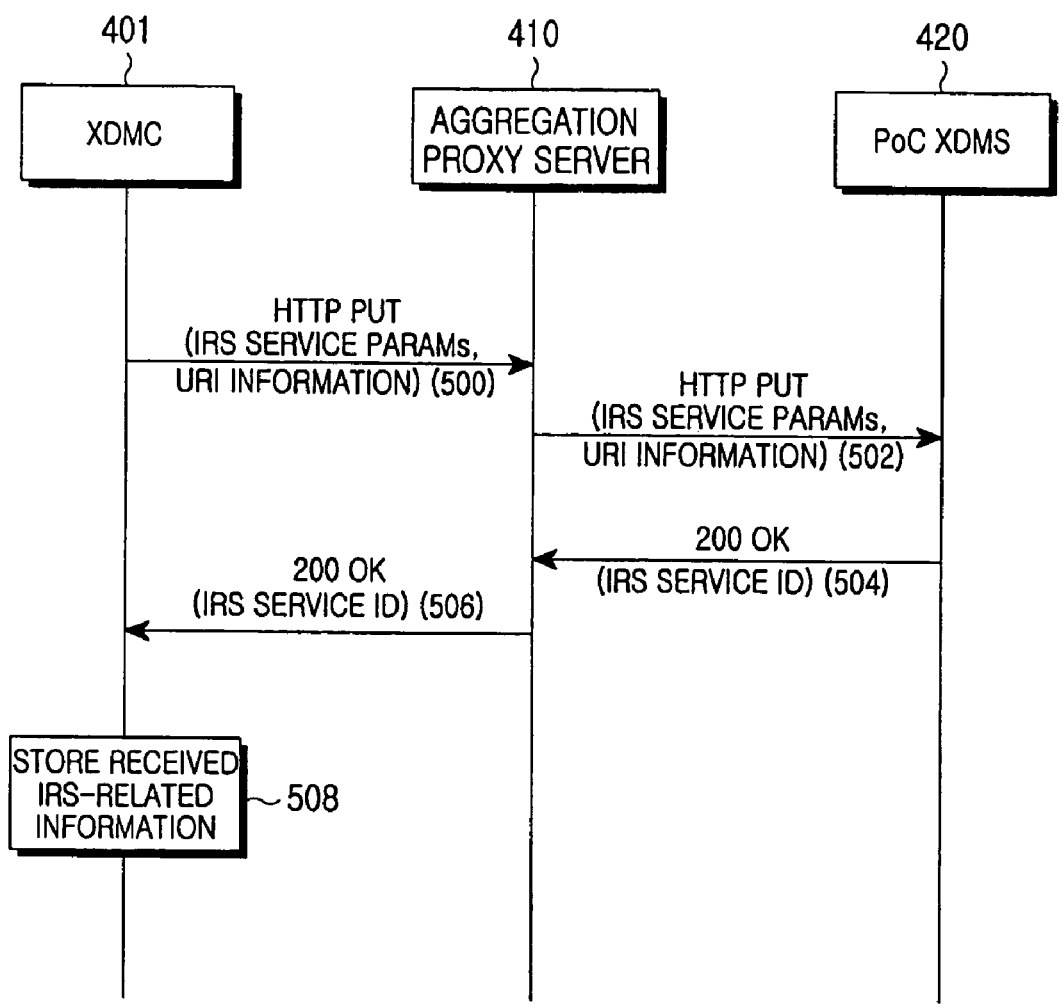
FIG. 5 shows the flow of signals between a PoC UE for providing an IRS and a PoC XDMS according to the present invention.

The IRS request message already includes URI list information in the process of issuing an IRS ID, as shown in FIG. 5. Therefore, it is unnecessary to insert target URI information inserted into the PUBLISH message. If an IRS ID has been issued instead of target URI information in the course of FIG. 5, it is necessary to insert corresponding information, i.e., a URI list or group URI, into the SDP body portion of the IRS request message in the course of FIG. 6.

After receiving the IRS ID and the IRS request message from the PoC client 402 in step 608, the PoC server 430 transmits a subscription request message for subscribing to information, which is necessary to provide an IRS, to the PoC XDMS 420 in step 614. The subscription request message includes the IRS ID received from the PoC client 402 and is used to subscribe to IRS-related information (e.g., target URI information stored while being mapped onto the IRS ID, IRS parameters) provided by the PoC XDMS 420.

After receiving the subscription request message, the PoC XDMS 420 transmits a response message to the PoC server 430 in step 616 and transmits the IRS-related information stored while being mapped onto the received IRS ID, particularly the target URI information and IRS parameters, to the PoC server 430 in step 618. Upon receiving the IRS-related information, the PoC server 430 transmits a response message to the PoC XDMS 620 in step 620. The PoC server 430 evaluates the service condition in step 622 and, if the evaluated service condition is acceptable, initializes the session in step 624. Depending on if presence information is included or not, the PoC server 430 may interwork with the presence server in the process of receiving the IRS parameter from the PoC XDMS 420 by means of the IRS ID and establishing a group session in accordance with the service condition.

The SIP PUBLISH message, which is used by the PoC client 402 to request the PoC server 430 to provide an IRS in the course of FIG. 6, will now be described with reference to FIG. 8, which shows an example of the SIP PUBLISH message.

Generally, the SIP PUBLISH message extends the PoC service setting, which is defined by PoC1, and includes "irs-service" element. Depending on the value of "true" or "false, it is decided if an IRS is requested or not. The SIP PUBLISH message also includes "irs-id" element, which is used by the PoC server 430 to retrieve the requested IRS parameter from the PoC XDMS 420, and which may be indicated by a binary number.

Realization of the extended SIP PUBLISH message requires definition of an XML schema. However, definition of the schema falls out of the scope of the present invention, and further description thereof will be omitted herein.

In summary, the present invention provides a PoC XDMS-interworking IRS, as shown in FIG. 5, by setting an IRS parameter for defining a network-based session initialization condition between the XDMC 401 inside the PoC UE 400 and the PoC XDMS 420. Based on the parameter setup, the PoC UR 400 receives an IRS ID from the responding PoC XDMS 420. As shown in FIG. 6, the PoC client 402 retrieves the stored IRS ID at the IRS request and transmits a message for requests an IRS corresponding to the IRS ID to the PoC server. Upon receiving the message, the PoC server 420 receives an IRS parameter, which has been mapped onto the IRS ID, from the PoC XDMS 420 and establishes a session if the service condition is satisfied.

The network element for storing IRS service parameter is not limited to PoC XDMS, and the other element of the network for providing a PoC service can be used. Therefore, a Shared XDMS or newly defined IRS service storage for storing the same service parameter may be used. Even when the network construction such as the above is changed, the contents of same service parameter and the flow of signal as described in the present invention can be applied.

As mentioned above, the present invention has the advantage of a reduced burden of signaling on the PoC server, which manages PoC sessions, by dividing the method for providing an IRS by initiating a session based on the network into a process for setting up an IRS parameter and a process for requesting a service, when various conditions for session establishment are satisfied. In addition, relevant XML data can be managed more dynamically by creating, modifying, and deleting IRS parameters in the same manner as target URI list information.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for establishing a Push to Talk Over Cellular (PoC) group session in a PoC system, comprising:
   a PoC extensible markup language Document Management Server (XDMS); and
   a PoC server,
   wherein the PoC XDMS receives Invitation Reservation Service (IRS)-related information from a PoC terminal, the IRS-related information defining a session initialization condition, the PoC XDMS transmits an IRS IDentification (ID) for identifying the IRS-related information to the PoC terminal, and the PoC server performs session initialization by using the IRS ID when an IRS request message is received from the PoC terminal, and
   wherein the IRS-related information comprises a presence information type for session initialization of an invited PoC client, a session request triggering condition, and an expiration time of IRS request.

2. The system as claimed in claim 1, wherein the PoC server is adapted to check an IRS parameter from the PoC XDMS when the PoC server receives the IRS request message, the IRS parameter having been mapped onto a corresponding IRS ID, and initialize a session when a service condition is satisfied.

3. The system as claimed in claim 1, wherein the IRS-related information comprises at least one piece of information selected from the group consisting of IRS parameter information and target Uniform Resource Indicator (URI) information, an IRS being to be applied to the target URI information.

4. A terminal for providing an Invitation Reservation Service (IRS) using Session Initiation Protocol (SIP)/Internet Protocol (IP) core networks in a terminal, the terminal comprising:
   a data transmission unit for transmitting/receiving packet data to/from a first server;
   an IRS managing unit for managing Invitation Reservation Service (IRS)-related information by interworking with and controlling to store mapping information of the IRS-related information;
   a client for requesting the first server to provide an IRS by using the mapping information at an IRS request; and
   a memory unit for storing the IRS-related information and the mapping information,
   wherein the IRS-related information includes a presence information type for session initialization of an invited client, a session request triggering condition, and an expiration time of IRS request.

5. The terminal as claimed in claim 4, wherein the client generates a message having information for requesting an IRS, information for requesting subscription of the IRS-related information stored in a second server, and mapping information of the IRS-related information and transmits the message to the first server.

6. The terminal as claimed in claim 5, wherein the IRS managing unit controls to receive the mapping information from the second server and to store the received mapping information to the memory unit.

7. The terminal as claimed in claim 4, wherein the IRS managing unit stores the IRS-related information in the memory unit and generates the mapping information related to the IRS-related information.

8. A method for providing an Invitation Reservation Service (IRS) using Session Initiation Protocol (SIP)/Internet Protocol (IP) core networks in a terminal, the method comprising the steps of:
   generating IRS-related information defining a session initialization condition and transmitting the IRS-related information to a first server;
   receiving mapping information of the IRS-related information from the first server and storing the mapping information; and
   transmitting, to a second server, an IRS request message for requesting the second server to provide an IRS for session initialization by using the mapping information,
   wherein the IRS-related information comprises a presence information type for session initialization of an invited client, a session request triggering condition, and an expiration time of IRS request.

9. The method as claimed in claim 8, wherein the mapping information comprises an IRS Identifier (ID) for identifying the IRS-related information stored in the server.

10. The method as claimed in claim 8, wherein transmitting the IRS-related information to the first server comprises generating the mapping information related to the IRS-related information.

11. The method as claimed in claim 10, wherein the mapping information comprises an IRS Identifier (ID) for identifying the IRS-related information stored in a memory unit of the terminal.

12. The method as claimed in claim 8, wherein the IRS-related information comprises at least one piece of information selected from the group consisting of IRS parameter information and target Uniform Resource Identifier (URI) information, an IRS being to be applied to the target URI information.

13. The method as claimed in claim 12, wherein the IRS parameter information comprises at least one piece of information selected from the group consisting of presence information type for session initialization, session initialization time, session request triggering condition, and IRS request expiration time information.

* * * * *